Feb. 25, 1969  J. E. HEIDER ET AL  3,429,003
APPARATUS FOR EXTRUDING PRODUCTS REINFORCED BY
ELONGATED CONTINUOUS FIBERS
Filed May 22, 1967  Sheet 1 of 2
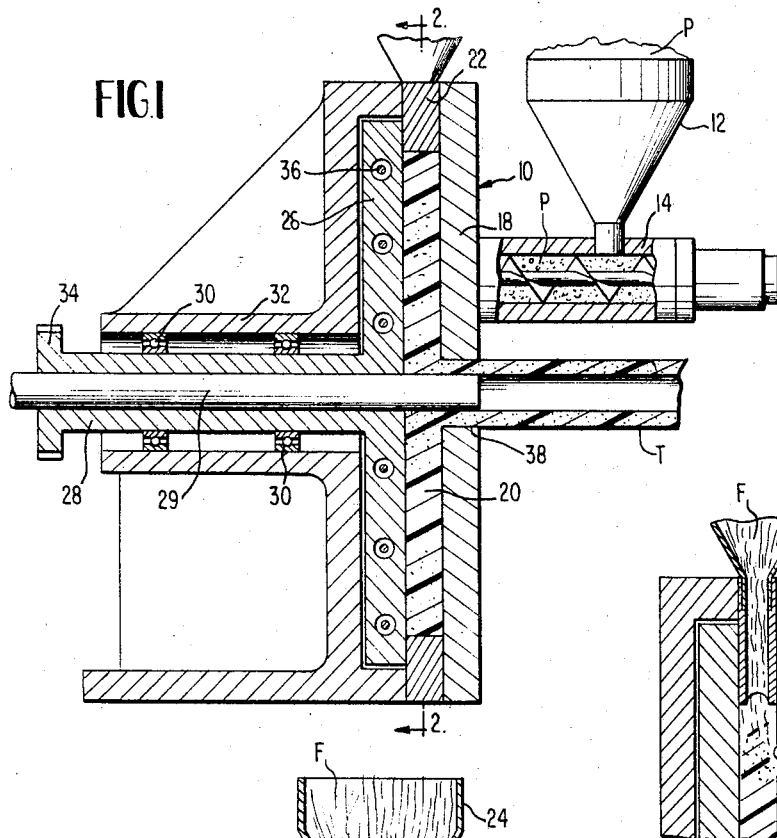
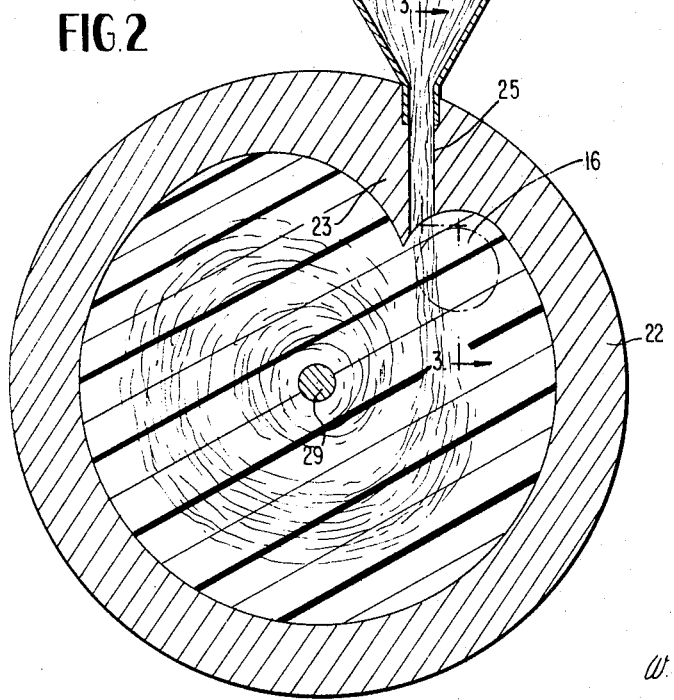
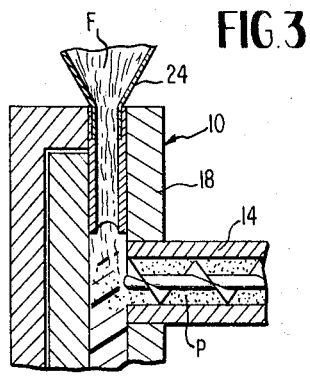
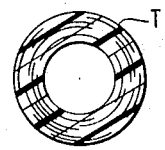
INVENTORS
THOMAS R. SANTELLI
JAMES E. HEIDER
BY W. A. Schaich & Sharon N. White
ATTORNEYS

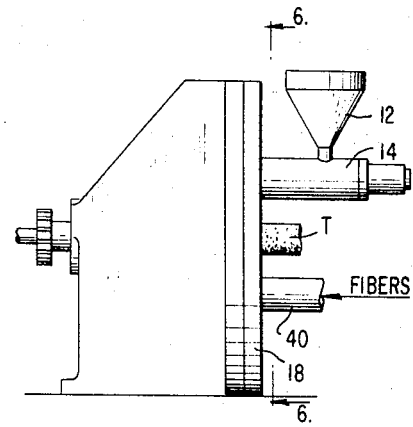
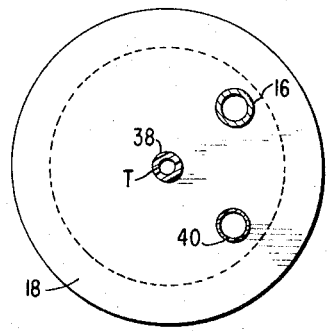
FIG.5  FIG.6
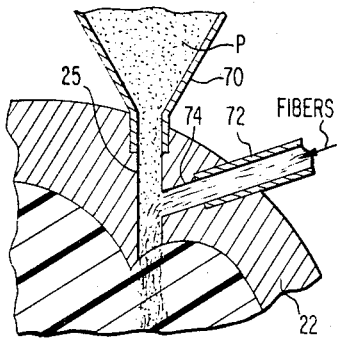
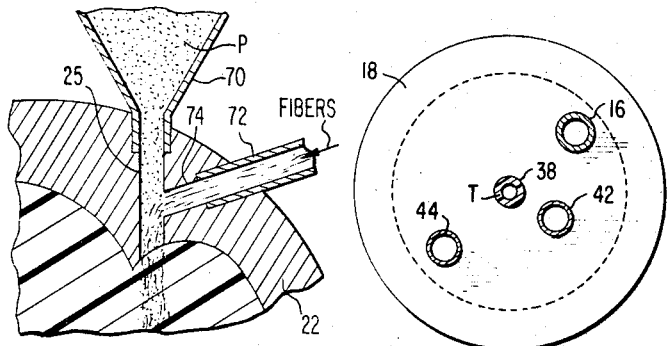
FIG.10  FIG.9
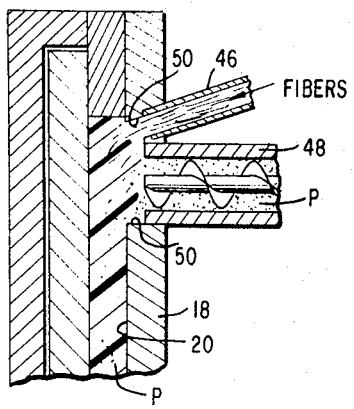
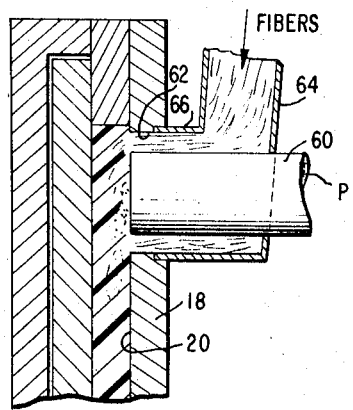
FIG.8
INVENTORS
THOMAS R. SANTELLI
JAMES E. HEIDER
BY
ATTORNEYS United States Patent Office 3,429,003
Patented Feb. 25, 1969

3,429,003
APPARATUS FOR EXTRUDING PRODUCTS REINFORCED BY ELONGATED CONTINUOUS FIBERS
James E. Heider, Toledo, and Thomas R. Santelli, Sylvania, Ohio, assignors to Owens-Illinois, Inc., a corporation of Ohio
Continuation-in-part of application Ser. No. 560,355, May 13, 1966, which is a continuation of application Ser. No. 422,191, Jan. 4, 1965. This application May 22, 1967, Ser. No. 649,773
U.S. Cl. 18—12       6 Claims
Int. Cl. B29d 23/04; B29b 5/04

ABSTRACT OF THE DISCLOSURE

In a centripetal extruder having a melt chamber and a rotating member for generating centripetal forces in the melt chamber for extrusion, the step of introducing elongated reinforcing members in the melt chamber to be spirally swept with the substance to be extruded and ultimately positioned in a spiral arrangement through the extruded product. The reinforcing members may be introduced into the melt chamber via the same inlet passage employed for feeding the substance to be extruded. Additionally or alternatively, the reinforcing members may be introduced into the melt chamber by one or more additional inlet passages suitably positioned either laterally or peripherally with respect to the melt chamber.

Related applications

This application is a continuation-in-part of our copending U.S. application Ser. No. 560,355 filed May 13, 1966 which is a continuation of our abandoned U.S. application Ser. No. 422,191 filed January 4, 1965.

Summary of objects and invention

The present invention relates to a method and apparatus for reinforcing extruded members simultaneously with the extrusion thereof and more particularly to a method and apparatus for manufacturing fiber-reinforced extrudates such as piping, tubing, rods, gobs, pellets, parisions, etc., wherein the fibers are continuously fed and are oriented.

It is known in the art to employ a screw-type extruder to extrude a mixture or blend of fibers, such as glass, and plastic materials. However, the use of such apparatus results in the fibers being chopped or severed into small pieces due to the shearing action of the tight fitting screw and barrel. As a result, the effectiveness of long fibers for purposes of reinforcement has been greatly reduced. In addition, it is noted that extreme wear of the extruder screw and barrel takes place. Other extruding means such as a simple heating cylinder and transfer plunger to force the hot plastic through a die are objectionable due to the slowness and intermittent nature of the operation.

Accordingly, one of the objects of the present invention is to provide an improved method and apparatus for reinforcing extruded products with elongated fibers or similar reinforcing members.

A further object of the present invention is to provide such a method and apparatus wherein the reinforcing fibers are not fractured or severed during the extrusion, but rather are maintained in substantially uninterrupted condition.

Another object of this invention is to provide apparatus which obviates the above-noted problem of excessive wear due to abrasive action of short fibers.

A further object of this invention is to provide such a method and apparatus which are rapid and efficient, and wherein the fibers are continuously fed and oriented around the extruded product in substantially uninterrupted condition.

Other and further objects and advantages of the present invention will be hereinafter described and the novel features thereof defined by the appended claims.

The above objects are achieved by feeding elongated reinforcing members into the melt chamber of a centripetal extruder. This causes the reinforcing members to be spirally swept with the material to be extruded ultimately positioned in the extruded product in a continuous and spiral arrangement. The reinforcing members may be introduced into the melt chamber via the same inlet passage employed for feeding the substance to be extruded. Additionally or alternatively, the reinforcing members may be introduced into the melt chamber by one or more additional inlet passages suitably positioned either laterally or peripherally with respect to the melt chamber.

In further explanation of the invention, reference is made to the accompanying drawings in which:

FIG. 1 is a schematic side elevation partly in section of novel apparatus constituting one embodiment of this invention;

FIG. 2 is a transverse section along line 2—2 of FIG. 1;

FIG. 3 is a fragmentary transverse section along line 3—3 of FIG. 2;

FIG. 4 is a transverse section of the tubing produced by the apparatus of this invention;

FIG. 5 is a schematic side elevational view of an extruder illustrating a modification of the present invention;

FIG. 6 is a cross-sectional view taken generally along lines 6—6 of FIG. 5;

FIG. 7 is a view similar to FIG. 6 except illustrating a further modification of the invention;

FIG. 8 is a fragmental, cross-sectional view of an extruder illustrating yet another modification of the present invention;

FIG. 9 is a fragmental, cross-sectional view illustrating still another modification of the present invention; and FIG. 10 is a fragmental, cross-sectional view similar to FIG. 2 but illustrating yet another modification of the present invention.

It is to be noted that while the device of the subject invention can be used to produce many types of extrudates, the disclosure specifically discusses the manufacture of plastic tubing.

Like reference characters designate corresponding parts in the several figures of the drawings, where as illustrated in FIG. 1, 10 designates a centripetal extruder constituting one embodiment of the invention, provided with a hopper 12. The plastic material P is fed by a worm mechanism 14 through an opening 16 in the stationary wall or plate 18 which leads laterally into melt chamber 20 of extruder 10. The melt chamber 20 is bounded by a gap plate 22 at whose upper end is a hopper 24 for the peripheral continuous introduction of reinforcing fibers F (FIGS. 2 and 3) by means of channel 25 into melt chamber 20. The gap plate 22 has a projection 23 which extends into melt chamber 20.

The centripetal extruder 10 is provided with a cylindrical rotor member 26 which is attached to a shaft 28. The shaft 28, which has a non-rotatable mandrel 29 in the center thereof, is mounted in suitable bearing 30 in the casing 32 and is constantly rotated by a motor (not shown) through gear 34. Heating elements 36 are provided in rotor member 26 to heat the plastic material P to a temperature which will give it the desired fluidity for extrusion.

In operation, plastic material P, such as pellets, are fed from hopper 12 by worm 14 through lateral opening 16 into melt chamber 20. Simultaneously, fibers F, such as glass, are continuously fed from hopper 24 by way of channel 25 and peripherally into melt chamber 20.

The heating element 36 is then turned on to melt the plastic material into a liquid mass. The motor (not shown) is then started and effects rotation of the shaft 28 and rotor 26. This rotation causes the liquid plastic in the melt chamber 20 to become sheared as is well known in the operation of centripetal extruders. The fibers F entering tangentially and peripherally of the chamber 20, are swept spirally or in a rotary manner toward the mandrel 29 (FIG. 2) without any appreciable breaking of the fibers. This rotary or spiral motion is facilitated or accentuated by member 23. As the rotational speed of member 28 is increased, the shearing stress is increased and a force normal to this stress is developed which is of such magnitude as to cause the fluid plastic material to be extruded through die opening 38, due to a centripetal pumping action, as a plastic tubing T which is characterized by having the glass fibers substantially continuous and intact and disposed or oriented around the diameter of the tube T as shown schematically in FIG. 4.

Within the concept of the invention, the reinforcing fibers may be fed into the melt chamber of the extruder from locations other than that described above. For example as shown in the modification of FIGS. 5 and 6 the reinforcing fibers may be fed laterally into the melt chamber through inlet conduit 40 which communicates with the melt chamber at an area angularly spaced from inlet 16 through which the plastic material P to be extruded is fed. As shown in FIG. 6, conduit 40 may be at the same radial distance from the die opening 38 as inlet 16, or at a different radial distance as illustrated in the modification of FIG. 7. In the latter modification, two separate inlet conduits 42 and 44 are employed to laterally feed the reinforcing fibers into the melt chamber. Conduit 42 is positioned closer to die opening 38 than conduit 44 which may be at the same radial distance as that of inlet 16 as shown in FIG. 7 or at a different radial distance (not shown). Moreover additional inlets and other radial spacings (not shown) for introducing the reinforcing fibers into the extruder may be employed.

The present invention may also be practiced by introducing the reinforcing fibers and the plastic material to be extruded, into the extruder through means of a common inlet passage. In this regard, reference is now made to the three modifications of the invention shown in FIGS. 8, 9 and 10. In the FIG. 8 modification, the reinforcing fibers are fed laterally into the melt chamber by a conduit 46 which extends at an oblique angle relative to the conduit 48 which feeds the plastic material P. However, conduits 46 and 48 merge into a common conduit or passage 50 formed in extruder wall 18 in communication with the melt chamber.

In the modification of FIG. 9, the plastic to be extruded is fed laterally into the melt chamber 20 through conduit 60 which extends through the inlet passage 62 formed in end wall 18 in communication with the melt chamber. Inlet passage 62 has a larger diameter than conduit 60 so as to define an annular passage around conduit 60 communicating with melt chamber. The reinforcing fibers are introduced into the melt chamber by means of this annular passage; the fibers being conveyed to the annular passage by any suitable conduit shown as an angular conduit 64 having a laterally extending portion 66 fixed concentrically in passage 62.

In the modification of FIG. 10, the plastic substance P to be extruded is fed tangentially into the melt chamber by means of a hopper 70 communicating with passage 25 which leads into the melt chamber from the periphery of the extruder. The reinforcing fibers are fed into the melt chamber by means of a conduit 72 extending from the periphery of the extruder at an angle to passage 25. A passage 74 is formed in the extruder wall 22 to interconnect passage 25 and conduit 72. Thus in the present modification, passage 25 is employed to feed both the plastic substance P and the reinforcing fibers, into the melt chamber.

From the foregoing description, it will be apparent that there has been devised a novel method and apparatus for producing plastic members such as tubing (or pipe) in which the reinforcing fibers are not only oriented around the diameter of the tubing rather than lengthwise, but are substantially continuous thereby effecting a greater reinforcement of the tubing than short fiber reinforcement where actually the short fibers constitute nothing more than fill.

Various modifications of the present invention will be apparent to those skilled in the art. Although the manufacture of plastic tubing or pipe has been shown, it is evident that the apparatus is equally adaptable to plastic rod by omitting mandrel 29. For certain applications, it may be desirable to use a fine gauge of wire instead of glass fibers. In addition, various plastic materials may be extruded such as polyethylene, polystyrene, and polypropylene.

While specific embodiments have been shown and described in detail to illustrate the present invention, it will be understood that the invention may be embodied otherwise without departing from such principles.

1. A centripetal extruder for manufacturing fiber reinforced plastic tubing wherein the fibers are oriented around the diameter of the tubing comprising a rotating member having an axis of rotation, a fixed member, a melt chamber positioned between said rotating member and fixed member, feeding means for introducing plastic material laterally into said melt chamber, a gap member positioned between said rotating member and fixed member, a second feeding means for continuously introducing through said gap member reinforcing fibers peripherally into said melt chamber whereby the fibers are pulled into said melt chamber by the rotating member and blended with said plastic material, an outlet opening in said fixed member generally aligned with the axis of rotation of said rotating member, and means for actuating said rotating member to cause a flow of plastic material and fibers in a rotary direction through said opening without substantial breaking of said fibers.

2. A centripetal extruder for manufacturing fiber reinforced extruded plastic tubing wherein the fibers are oriented around the diameter of the tubing comprising a rotating member having an axis of rotation, a fixed member, a melt chamber positioned between said rotating member and fixed member, feeding means for introducing the plastic material laterally into said melt chamber, a gap member positioned between said rotating member and fixed member, a second feeding means for continuously introducing reinforcing fibers peripherally into said melt chamber whereby the fibers are pulled into said melt chamber by the rotating member and blended with said plastic material, an outlet opening in said fixed member generally aligned with the axis of rotation of said rotating member, means for actuating said rotating member to cause a flow of plastic material fibers in a rotary direction through said opening without breaking of said fibers and means for cooling said tubing.

3. A centripetal extruder for manufacturing fiber reinforced extruded plastic tubing wherein the fibers are oriented around the diameter of the tubing comprising a rotating member having an axis of rotation, a fixed member, a melt chamber positioned between said rotating member and fixed member, feeding means for introducing the plastic material laterally into said melt chamber, a gap member positioned between said rotating member and fixed member, a projection extending from said gap member into said melt chamber, a second feeding means for continuously introducing through said gap member reinforcing fibers peripherally into said melt chamber whereby the fibers are pulled into said melt chamber by the rotating member and blended with said plastic material, an outlet opening in said fixed member generally aligned with the axis of rotation of said rotating member, and means for actuating said rotating member to cause a flow of plastic material and fibers in a rotary direction through said opening without breaking said fibers.

4. A centripetal extruder for manufacturing products reinforced with continuous elongated members comprising in combination; a rotating member having an axis of rotation and an end face rotatable about said axis of rotation, a casing receiving the rotating member and having a stationary member spaced from said end face and cooperating therewith to define a melt chamber, first feeding means for introducing flowable material into said melt chamber for forming the product, said first feeding means including a passage extending through the casing and a movable mechanical means located in a portion of said passage for advancing the flowable material through said passage and into said chamber, second feeding means for introducing elongated reinforcing members into the melt chamber whereby the reinforcing members are spirally swept with said flowable material, said second feeding means including a second passage extending through the casing externally of said first passage, said second passage being unobstructed and radially spaced from said axis of rotation to facilitate introduction of the reinforcing members into the melt chamber, an outlet opening in said casing generally aligned with the axis of rotation of said rotating member, and means for driving said rotating member to cause a flow of material and reinforcing members generally about said axis of rotation and through said outlet opening without substantial breaking of said reinforcing members.

5. A centripetal extruder for manufacturing products reinforced with continuous elongated members comprising, a rotating member having an axis of rotation and an end face rotatable about said axis of rotation, a casing receiving the rotating member and having a stationary member spaced from said end face and cooperating therewith to define a melt chamber, feeding means for introducing flowable material into said melt chamber for forming the product, feeding means for introducing reinforcing members peripherally into the melt chamber and also tangentially with respect to the rotative direction of the rotating member whereby the reinforcing members are spirally swept with said flowable material, an outlet opening in said casing generally aligned with the axis of rotation of said rotating member, and means for driving said rotating member to cause a flow of material and reinforcing members generally about said axis of rotation and through said opening without substantial breaking of said reinforcing members.

6. A centripetal extruder for manufacturing products reinforced with continuous elongated members comprising, a rotating member having an axis of rotation and an end face rotatable about said axis of rotation, a casing receiving the rotating member and having a stationary member spaced from said end face and cooperating therewith to define a melt chamber, feeding means for introducing flowable material laterally into said melt chamber for forming the product, feeding means for introducing reinforcing members peripherally into the melt chamber whereby the reinforcing members are spirally swept with said flowable material, an outlet opening in said casing generally aligned with the axis of rotation of said rotating member, and means for driving said rotating member to cause a flow of material and reinforcing members generally about said axis of rotation and through said opening without substantial breaking of said reinforcing members.

References Cited

UNITED STATES PATENTS

| | | | |
|---|---|---|---|
| 1,095,979 | 5/1914 | Eberhard | 18—13 |
| 2,933,175 | 4/1960 | Grey | 18—12 |
| 3,009,685 | 11/1961 | Rettig. | |
| 3,032,814 | 8/1962 | Minor | 18—12 |
| 3,082,476 | 3/1963 | Bunch | 18—12 |
| 3,148,412 | 9/1964 | Spreeuwers | 18—12 |
| 3,193,877 | 7/1965 | Edwards | 18—12 |
| 3,245,116 | 4/1966 | Hendry | 18—12 |
| 3,277,528 | 10/1966 | Nikiforov | 18—12 |

WILLIAM J. STEPHENSON, *Primary Examiner.*